United States Patent Office 2,816,818
Patented Dec. 17, 1957

2,816,818
PROCESS FOR THE PREPARATION OF AMMONIUM FLUORIDE

John H. Gross, Lakeland, Fla., assignor to International Minerals & Chemical Corporation, a corporation of New York No Drawing. Application December 31, 1954
Serial No. 479,227

4 Claims. (Cl. 23—88)

This invention relates to the preparation of ammonium fluoride from waste gases containing fluorine. More particularly it relates to the conversion of silicon tetrafluoride found in phosphate contaminated gases produced in the processing of phosphates to ammonium bifluoride. Still more particularly, it relates to the purification of fluoride solutions obtained by absorption of den gases in aqueous media, condensation of gases given off in the concentration of phosphoric acid, and the like.

In the manufacture of superphosphate by the treatment of phosphate rock with sulfuric acid, gases are evolved containing hydrofluoric acid, silicon tetrafluoride, and other vapors which offer an excellent starting material for the manufacture of fluoride chemicals.

Various methods have been devised for the conversion of the fluorine into usable form such as sodium fluoride, synthetic cryolite, and other compounds; but the methods have not proved entirely satisfactory because of operating difficulties revolving around the presence of phosphates in the fluosilicate solutions. The reaction of calcium phosphate with fluosilicic acid forms an insoluble calcium fluoride and phosphoric acid. The latter remains in solution during any subsequent reactions, for example, with ammonia, thereby contaminating the ammonium fluoride and other products.

It is a primary object of this invention to overcome the disadvantages and shortcomings of processes heretofore in use.

It is a further object of this invention to provide a method for the removal of phosphatic impurities from fluoride solutions.

It is another object of this invention to provide a process for the production of derivatives of fluosilicic acid which are substantially free from phosphatic impurities.

It is a further object of this invention to provide a process for the production of a relatively pure ammonium bifluoride.

These and other objects of the invention will become apparent from the description as hereinafter provided.

Now it has been discovered that either by completely neutralizing and hydrolyzing the fluosilicic acid solution obtained by, for example, absorption of den gases, with ammonia under conditions to precipitate silica in a preliminary operation following which the solution may be treated in a second step with ammonia under conditions whereby the solution is made to take up more than about 1% of free ammonia so as to precipitate ammonium phosphate, or by a single step operation whereby silica and phosphates are precipitated together, the phosphate can be substantially completely eliminated. Free ammonia as used here means dissolved ammonia in excess of the amount combined as dissolved ammonium fluoride and triammonium phosphate. Then following separation of the precipitated solids, a liquor is obtained which is substantially free of phosphates and which may be treated to recover ammonium fluoride or ammonium bifluoride, as well as the free ammonia used for the separation.

The process of the instant invention involves absorbing hydrofluoric acid and silicon tetrafluoride from gases which also contain phosphatic impurities in aqueous solutions preferably having a pH between about 3.5 and about 5.5. For example, the fluoride bearing constituents of den gas are absorbed in water to which sufficient ammonia has been added or is added during the absorption operation to maintain the pH preferably between about 4 and about 5, while at the same time maintaining the temperature of the resulting solution below about 40° C.

The solubility of phosphates such as phosphate rock in the absorption solution increases as the temperature increases. The reaction occurring during the absorption is exothermic, and for this reason the absorbing solution should be cooled so that the temperature is maintained at or between about the freezing point of the solution and about 40° C., preferably between about 10° C. and about 25° C.

When ammonia is added to the water employed for the absorbing of fluorine-bearing gases, the solubility of the phosphate rock in the absorption solution varies markedly. The solubility of phosphate rock decreases with increasing pH's between about 2.0 and about 4.5. A minimum in phosphate solubility occurs at a pH of about 4.5 and increases only very slowly up to a pH of about 5.5. When the pH of the absorption solution is higher than 5.5, the solubility of phosphate increases rapidly until approaching a pH of about 7. At a pH between about 7 and about 8, sufficient ammonia has been added that essentially all fluosilicate originally present has been hydrolyzed, precipitating silica, and the solution contains ammonium fluoride and phosphate such as di- and triammonium phosphates. When ammonia equivalent to all monovalent fluoride and trivalent phosphate ions in solution has been added, the pH has increased to about 9. Any ammonia added beyond this point dissolves as "free ammonia," raising the pH further by shifting the ammonia hydrolysis equilibrium. Also, the addition of free ammonia reduces the solubility of phosphate in the solution, effectively to the vanishing point at high concentrations of free ammonia. A neutral or slightly alkaline ammonium fluoride solution containing phosphate impurity is made by absorbing den gas containing entrained phosphate particles in aqueous medium the pH of which may be held between about 3.5 and about 5.5 by addition of the proper amount of ammonia to minimize solubility of phosphates, and by adding further ammonia to this absorption solution to raise the pH to about 8 or 9, completing the hydrolysis of fluosilicate and precipitation of silica; or a similar contaminated ammonium fluoride solution may be made in any other way. Free ammonia may then be added to this solution, and after sufficient free ammonia has been added it will be found that essentially all phosphate has been precipitated. This phosphate is substantially free of fluorine, if the fluorine concentration of the solution does not exceed between about 10% to about 12% by weight.

In the preferred embodiment of the instant invention gas containing fluorides and phosphate impurities is passed through an aqueous solution containing sufficient ammonia to maintain the pH of the resulting absorption solution close to about 4.5. The temperature of the absorption solution is maintained at between about 10° C. and about 20° C. Undissolved material or any precipitated silica are separated from the resulting solution, for example, by filtration or by centrifuging.

The resulting solution is then adjusted in pH to between about 8 and about 10, preferably between about 8 and about 9, by the addition of ammonia. During agitation of the pH adjusted solution, a more complete precipitation of silica is effected, leaving a solution containing ammonium fluoride, phosphate, and a small amount of free ammonia. Preferably this is accomplished by adding resulting solution and anhydrous ammonia to ammonium fluoride solution containing free ammonia. The precipitated material is separated by suitable means such as filters or centrifuges and the solids discharged to waste.

Anhydrous ammonia is next added to the silica-free solution to establish a concentration of free ammonia preferably above about 10%, the amount of free ammonia being chosen according to the degree of removal of phosphatic impurity desired. Silica-free solution for this operation may be introduced into a closed vessel containing an atmosphere of ammonia under pressure of about 5 to about 50 pounds per square inch absolute. Silica-free fluoride solution reacts with the ammonia to precipitate triammonium phosphate.

Ammonium phosphates may be separated by suitable means such as filtration and centrifuging and subsequently treated with phosphoric acid to adjust the ammonia-phosphoric acid ratio to the desired level, thus recovering a useful by-product.

Filtrate from the ammonium phosphate separation step may next be concentrated or the solution reduced all the way to dryness depending upon whether a wet or dry form ammonium fluoride or ammonium bifluoride is desired. In this step the dissolved ammonia necessary to render triammonium phosphate insoluble also is recovered. Concentration of ammonium fluoride solutions may be carried out at temperatures in the range of between about 25° C. and about 160° C. at pressure varying from about 28 inches vacuum to about 50 pounds per square inch gauge.

The following examples are presented in order to afford a clearer understanding of the invention, but they are given as illustrative only without any intention to limit the invention thereto.

Example I

Den gas containing phosphate rock particles was scrubbed with water in a Schutte-Koerting scrubber. The resulting impure fluosilicic acid solution was filtered to remove insoluble matter and was then reacted with anhydrous ammonia in the presence of a sufficient excess of aqueous ammonia that the pH of the reaction mixture was maintained between about 8 and about 9. The resultant slurry was then passed through a basket centrifuge to remove precipitated silica. The precipitated silica was washed with water on the centrifuge. The combined clarified solution and wash water had the following analysis:

|   | G./l. |
|---|---|
| F | 62.7 |
| P | 3.50 |
| NH$_3$ | 65.2 | which analysis corresponds to a solution containing ammonium fluoride, triammonium phosphate, and 0.3% free ammonia. To 109.2 pounds of this solution were added 36.14 pounds of anhydrous ammonia, with cooling, the final temperature of the solution being 22° C. The amount of ammonia added corresponded to saturation of the solution with ammonia under a partial pressure of ammonia of approximately one atmosphere at 22° C. Triammonium phosphate precipitated in this step was removed by filtration. The ammoniacal ammonium fluoride solution from this filtration after dilution for analyses had the following composition:

|   | G./l. |
|---|---|
| F | 10.9 |
| NH$_3$ | 76.6 |
| P | 0.012 |

Example II

A solution containing 8.99% fluorine, 4.18% P$_2$O$_5$, and 10.16% ammonia was introduced into a closed reaction vessel. Anhydrous ammonia was added to this solution in increments with cooling such that the temperature did not rise above 35° C. at any time. After each addition of ammonia, the temperature was brought to 25° C. and solids were allowed to settle. A small sample of the supernatant liquid then was filtered and analyzed. These steps were repeated after each addition of ammonia. In this manner a series of solutions of progressively lower phosphate content were made which analyzed as follows:

| Solution | F, Percent | P$_2$O$_5$, Percent | NH$_3$, Percent | Free NH$_3$, Percent | Sp. Gr. | pH |
|---|---|---|---|---|---|---|
| A | 9.52 | 2.39 | 11.02 | 0.78 | 1.094 | 9.25 |
| B | 10.07 | 0.92 | 11.90 | 2.23 | 1.075 | 9.55 |
| C | 10.89 | 0.52 | 13.78 | 3.66 | 1.058 | 9.92 |
| D | 11.02 | 0.275 | 16.03 | 5.96 | 1.038 | 10.02 |
| E | 10.86 | 0.119 | 19.27 | 9.45 | 1.017 | 10.30 |
| F | 10.4 | 0.057 | 22.26 | 12.90 | 0.998 | 10.75 |

Having thus described my invention what I claim is:

1. In a process for the manufacture of ammonium fluorides by the absorption of phosphate contaminated fluorine-containing gases in an aqueous medium and reacting the absorption liquor with ammonia, the steps comprising absorbing phosphate rock-sulfuric acid reaction den gases in an aqueous solution, reacting the aqueous solution with anhydrous ammonia under conditions to maintain the pH between about 8 and about 9, separating the precipitated solids, adding to the solids-free liquor anhydrous ammonia in quantity to saturate the solution with ammonia at a partial pressure of ammonia of approximately one atmosphere while maintaining the temperature of the solution at approximately 22° C., separating the precipitated triammonium phosphate and recovering a solution of ammonium fluoride substantially free of phosphate.

2. In a process for the manufacture of substantially phosphate free ammonium fluoride from phosphate contaminated solution prepared by the absorption of fluorine-bearing gases, including SiF$_4$, in an aqueous medium, the steps comprising reacting the phosphate containing solution with ammonia under conditions to maintain an alkaline pH not exceeding about 9 to precipitate silica, separating the precipitated silica, reacting the solids-free liquor with ammonia under conditions to maintain a free ammonia concentration greater than about 1% and to precipitate ammonium phosphate, removing precipitated ammonium phosphate from the reacted mixture and recovering ammonium fluoride from the resultant liquor.

3. In a process for the manufacture of substantially phosphate free ammonium fluoride from phosphate contaminated solution prepared by absorption of fluorine-bearing gases, including SiF$_4$, in an aqueous medium, the steps comprising reacting the phosphate containing solution with ammonia under conditions to maintain an alkaline pH of between about 7 and about 9 to precipitate silica, separating the precipitated silica, reacting the solids-free liquor with ammonia under conditions to maintain a free ammonia concentration greater than about 1% to precipitate ammonium phosphate, removing the precipitated ammonium phosphate from the reacted mixture and recovering ammonium fluoride from the resultant liquor.

4. In a process for the manufacture of substantially phosphate free ammonium fluoride from phosphate contaminated fluorine-bearing gases, including SiF$_4$, the steps comprising reacting said gases with an aqueous ammonia solution under conditions to maintain at all times a free ammonia concentration in the solution greater than about 1%, to cause precipitation of silica and ammonium phosphate, removing the precipitated material from the resultant liquor and recovering ammonium fluoride from the resultant liquor.

References Cited in the file of this patent

UNITED STATES PATENTS

| 1,235,552 | Chappell | Aug. 7, 1917 |
| 2,141,773 | Strothmeyer | Dec. 27, 1938 |